United States Patent Office 3,230,177
Patented Jan. 18, 1966

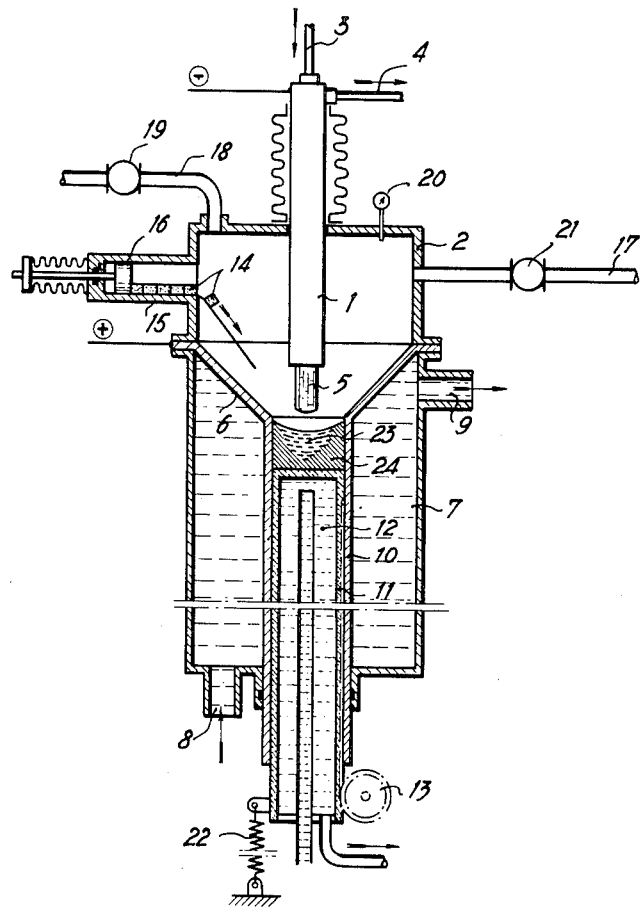

3,230,177
ACTINIDE OXIDE-ACTINIDE NITRIDE EUTECTIC COMPOSITIONS AND THEIR METHOD OF MANUFACTURE
Pierre Blum and Philippe Guinet, Grenoble, France, assignors to Commissariat a l'Energie Atomique, Paris, France
Filed June 12, 1962, Ser. No. 201,859
Claims priority, application France, June 21, 1961, 865,561
12 Claims. (Cl. 252—301.1)

The present invention has for its object new refractory products which can be designated by one of the two following formulae: $XO_2/XN$, or else $XO_2/YN$ representing the eutectic formed between the oxide and nitride of a same element X or else between the oxide of an element X and the nitride of an element Y, the elements X and Y forming part of the actinide series or lanthanide series.

In accordance with a preferred form of embodiment of the invention, the eutectic is formed by fissionable elements such as natural uranium, uranium 233, plutonium, or fertile elements such as thorium.

There are thus made available new nuclear fuels of the refractory type which are accordingly capable of withstanding high operating temperatures. As compared with the refractory fuels which have hitherto been employed, these new fuels provide substantial advantages as a result of their remarkable physical and chemical properties.

It especially follows as a result that the said fuels have higher thermal and electrical conductivity than the corresponding oxides. For example, the eutectic $UO_2/UN$ (the composition of which corresponds to 1 molecule of $UO_2$ for 1 molecule of UN) has better thermal conductivity than the oxide $UO_2$. The result thereby achieved is that, on the one hand, the heat transfer between the fuel and the cooling fluid takes place under better conditions and that on the other hand, the fuel will offer better resistance to thermal collision in the case of variations of operation or of shutdown of the nuclear reactor.

These new fuels are also characterized in many cases by a high resistance to oxidation and to chemical corrosion. It accordingly follows that the eutectic $UO_2/UN$ provides better resistance to oxidation than the uranium carbide UC. The good chemical stability of said eutectic even at high temperature makes it capable, in the event of accidental can fracture, of avoiding the possibility of sudden damage when in contact with cooling fluid such as, for example, carbon dioxide gas or molten sodium.

As will be seen below, the new fuels can readily be produced in the form of solid slugs and consequently do not contain in the structure thereof a large number of pores which are detrimental both to the mechanical strength of the fuel and to the stability of the neutron level.

The combination of these hitherto incompatible properties clearly brings out the substantial value of the new refractory fuels as compared with the refractory fuels which have commonly been employed up to the present time such as, in particular, oxides and carbides.

With respect to the nitrides, the new fuels are especially characterized by the advantage of having a smaller neutron-capture cross-section.

It is useful to note, however, that since the neutron-capture cross-section of these new fuels is larger than that of the corresponding oxides (on account of the quantity of nitride contained in the eutectic) it must either be contemplated to employ the new fuels in fast-neutron reactors or else provision must be made for the enrichment of the said fuels in slow-neutron reactors.

For example, in this latter case, if the fuel employed is constituted by the eutectic $UO_2/UN$, it will be advisable to enrich the uranium up to a proportion by weight of $U235$ varying between 1 and 5% depending on the designed characteristics of the reactor.

Another solution which is also feasible in the case of slow-neutron reactors consists in making use of a fuel which contains both uranium and plutonium corresponding to the formula $UO_2/PuN$ and having a composition which is close to the eutectic, in which the molecular percentage of $UO_2$ is 65 to 75%.

It is in fact observed that these new refractory products can be obtained from compositions which do not strictly correspond to the eutectic but which are closely related thereto and have properties which are similar in particular to those which have just been referred-to.

Apart from those nuclear applications which have been more especially considered above, the present invention also relates to new refractory products having the properties which have previously been indicated (namely good conductivity and resistance to oxidation) and constituted by a eutectic consisting of an element chosen from the lanthanide series, for example lanthanum or praseodymium.

In a general manner, the eutectic which is made up of two constituents $XO_2$ on the one hand, and XN or YN on the other hand contains $n_1$ molecule of $XO_2$ and $n_2$ molecule of XN, or of YN. This ratio $n_1/n_2$ is specific to the nature of the constituents considered (that is to say the oxide and the nitride) but differs when a change is made in either the oxide or the nitride; the ratio can be equal to 1, as for example, in the case of the eutectic $UO_2/UN$ which is constituted by 1 molecule of $UO_2$ for 1 molecule of UN. The exact eutectic composition can readily be determined in each particular case by micrographic examination of the solid phase obtained as a result of cooling of a molten bath of the two constituents and by subsequent analysis of the zone containing the eutectic.

If it is desired to obtain a eutectic which is formed from two different metals, that is to say which corresponds to the formula $XO_2/YN$, it is possible to determine in advance which metal will be present in the form of oxide and which metal will be present in the form of nitride in the eutectic which is finally obtained, by using as a basis the formation heat-values of the oxides and nitrides of these two metals, the eutectic which is formed always corresponding to the greatest possible heat of formation. This theory is confirmed by experiment and it accordingly results that there is always obtained the eutectic $ThO_2/UN$ (containing 0.25 molecule of $ThO_2$ and 0.75 molecule of UN), but that it is not possible to obtain the eutectic $UO_2/ThN$, this being due to the fact that it is the eutectic $ThO_2/UN$ which corresponds to the maximum heat of formation.

On account of their eutectic composition, the new refractory products have an exactly defined melting point, as that of pure substances, and lower than the melting points of their constituents. Accordingly, the eutectic $UO_2/UN$ has a melting point of the order of 2,200° C. whereas the melting point of $UO_2$ is of the order of 2,850° C. and that of UN is of the order of 2,600° C. But it is important to note that the melting of $UO_2$ is accompanied by substantial vaporization and that the melting of UN results in a dissociation of this compound; on the contrary, during the melting of the eutectic $UO_2/UN$, no decomposition of the said eutectic takes place if the precaution is taken to carry out the operation in a nitrogen atmosphere. This very important property makes it possible to obtain the new refractory products in solid form and with theoretical density, which offers an undeniable advantage in a large number of applications. Whereas the refractory fuels which have hitherto been employed had to be prepared by means of costly processes of powder metallurgy (by reason of the virtual impossibility of obtaining them from the molten state), it becomes possible to effect the preparation of refractory components of any desired shape simply by casting in a suitable mould and in a nitrogen atmosphere. This simplification represents a very substantial technical advance and permits a considerable increase in production speed while at the same time reducing the cost price.

The invention also has for its object a method of manufacture of the new refractory products which have been previously defined, characterized in that the starting material employed is a mixture containing a metallic oxide $XO_2$ and a metal, X or Y, the molecular percentage of oxide and of metal in the said mixture corresponding substantially to the molecular percentage of the same oxide and of nitride of the said metal in the corresponding eutectic, and the melting of the said mixture as well as the nitriding of the metal is then carried out at high temperature in a nitrogen atmosphere, the cooling of the liquid bath obtained then subsequently producing by solidification the eutectic composition $XO_2/XN$ or $XO_2/YN$.

In accordance with an alternative form of practical application, and in order to prepare a eutectic $XO_2/XN$, a starting material is employed which contains an oxide of metal $XO_2$ and carbon, the molecular percentage of carbon in the said mixture being substantially double the molecular percentage of nitride in the corresponding eutectic, the melting of the said mixture as well as the reduction to the metallic state of a portion of the oxide and the nitriding of the metal obtained by reduction of the said portion of the oxide being carried into effect by means of a heat treatment at high temperature in a nitrogen atmosphere, the cooling of the liquid bath obtained subsequently producing by solidification the eutectic composition $XO_2/XN$.

In accordance with a preferred form of practical application of this method, the pressure of nitrogen employed during the heat treatment is intended to be comprised between 50 and 760 mm. of mercury, the nitrogen can be diluted with an inert gas, the total pressure of the gases remaining lower than or equal to 760 mm. of mercury. Heating is carried out by induction or by means of an arc furnace.

At the time of heating of the mixture of raw materials, there is rapidly formed a liquid phase which produces a good contact between these latter.

If the raw materials are formed by a mixture of oxide and metal, the rapid formation of the liquid phase results in the first place from the melting of the metal which is facilitated by the high temperature (for example, 2,500° C.) at which the treatment is performed and in the second place from the dissolving action of the molten metal on the oxide.

If the raw materials are made up of a mixture of oxide and carbon, this latter will reduce the oxide and liberate the metal according to the reaction:

$$XO_2 + 2C = X + 2CO$$

the condition being accordingly restored to that of the previous process.

In both one case and in the other, the molten metal nitrides in contact with the nitrogen and there is thus obtained in the actual centre of the liquid bath a mixture of metal oxide and metallic nitride. The composition of the said liquid bath is determined by that of the mixture of starting materials which must be appropriately chosen in each case in such manner that the composition of the liquid phase is substantially identical to the composition of the eutectic which is formed in the solid state by cooling of the bath. Under these conditions, the composition of the solid phase will be identical at all points and will similarly be identical at every moment to that of the liquid phase which floats on the top of the solidified portion. In other words, the solid will be perfectly homogeneous and of unvarying composition.

If it is desired to carry out continuous production, it is preferable to introduce the raw materials in the form of small briquettes or pellets having the composition desired, this method being particularly valuable when starting from a mixture of metallic oxide and carbon. If the starting material employed is a mixture of metallic oxide and metal, the oxide can be introduced in the form of small grains, for example of a few millimeters in size, while the metal can be introduced in the form of small chips or flakes. In any case, as a result of the formation of the liquid phase, an intimate mixture of the constituents will rapidly take place.

In all cases in which there is present an oxide of metal which can readily be reduced by the carbon with liberation of the metal, it is particularly advantageous to produce the metal in situ, since the preparation of the metal oxide is usually carried out under much more economical conditions than the preparation of the corresponding metal.

It accordingly follows, for example, that it will be preferable to produce the eutectic $UO_2/UN$ by employing as a starting material an equimolecular mixture of uranium dioxide and carbon.

The heating which is intended to produce the fusion can be produced either by an arc or by induction, both methods having the advantage of providing internal stirring action, thereby further improving the homogenization.

If an arc-melting process is adopted, a non-consumable electrode is employed, the active portion of which is constituted by a material which does not react with nitrogen at high temperature, such as, for example tungsten. The arc is struck and maintained, for example, at a current intensity of the order of 500 to 2,000 amperes and a load voltage of the order of 15 to 20 volts, these two factors depending mainly on the quantity of raw materials employed.

The reaction chamber is filled with nitrogen prior to heating, and if necessary, the nitrogen can be diluted with an inert gas such as argon or helium. The pressure of nitrogen must preferably be higher than 50 mm. of mercury; for reasons of convenience as regards the striking and maintenance of the arc, it is preferable to ensure that the total gas pressure (nitrogen alone or alternatively nitrogen plus inert gas) is less than 760 mm. of mercury. In this range of pressures, the partial pressure of nitrogen has no appreciable influence on the nitriding reaction which, after the metal has melted, takes place very rapidly. On account of the said nitriding reaction, there is a reduction of nitrogen pressure, and it is consequently necessary to reintroduce fresh nitrogen during the entire operation.

In the case in which the metal is produced in situ by reduction of a metal oxide by carbon, the formation of carbon monoxide accordingly results and provision is consequently made, in addition to the nitrogen supply pipe, for a pipe through which the carbon monoxide is evacuated as it is formed.

The practical operation of the method for the manufacture of the new refractory products can be carried out in a non-continuous manner by means of any known device, for example by feeding the charge of starting materials into a crucible which is provided with a cooling system and placed in a nitrogen atmosphere within an enclosure.

In accordance with a preferred form of embodiment of the invention, it is also possible to carry out the practical operation of this method in a continuous manner by making use of a device which will be described below.

This device is essentially characterized in that it comprises an arc furnace, means for continuously charging the said furnace with the mixture, a nitrogen inlet pipe, a nitrogen exit pipe, means for regulating the flow of this gas as a function of the pressure inside the said furnace, a crucible comprising a lower cylindrical extended portion, means for cooling the said crucible, a piston adapted to move inside the said extended portion and means for controlling the movement of the said piston progressively as the ingot is formed.

In accordance with a preferred form of embodiment, the said device also comprises means for coordinating the speed of progressive feeding of the charge and the speed of the equally progressive downward movement of the piston in such manner as to maintain the surface of the molten bath at a stationary level.

The said device is illustrated in the single accompanying figure in diagrammatic vertical cross-section.

There can be seen in this figure a non-consumable electrode 1 of copper which penetrates into the interior of a sealed-in furnace 2; the said electrode 1 is hollow and is water-cooled by means of an inlet 3 and an outlet 4, and is extended at the bottom end thereof by a stud 5 of tungsten. There is placed beneath the electrode 1 a crucible 6, for example of copper, which is water-cooled, the water being supplied through the inlet 8 and discharged through the outlet 9. The crucible 6 and the electrode 1 are connected respectively to the current input and current output, means (which have not been illustrated in the figure) being additionally provided for the purpose of isolating the said crucible and the said electrode. The crucible 6 is extended at the bottom portion thereof by a cylinder 10 which is open at its base. Inside the said cylinder 10 is adapted to move with slight friction a piston 11 of copper which is water-cooled at 12, the downward travel of the said piston being effected by any appropriate means such as those shown diagrammatically in the figure at 13 (rack and pinion), and at a speed of downward movement which can be regulated at will.

Furthermore, means are additionally combined with this assembly for the purpose of effecting a substantially continuous charging of the reaction mixture which is supplied, for example, in the form of pellets 14. Accordingly, the said pellets can be previously introduced into a housing 15 from the interior of which they are progressively withdrawn and conveyed towards the crucible 6 by means such as a piston 16.

A special apparatus can be provided for effecting the automatic weighing of the raw materials, then the mixing of these latter and subsequent compression in the form of pellets.

The admission into the interior of the furnace 2 either of nitrogen alone or of nitrogen which is diluted with an inert gas is effected through a tube-length 17; the gaseous atmosphere can be evacuated through a tube-length 18 which is fitted with a valve 19 and connected to a pump which has not been illustrated in the figure. A pressure-gauge 20 indicates at each moment the pressure which exists inside the enclosure. The tube-length 17 is connected to a reservoir tank (not shown in the figure) which contains the nitrogen under pressure, either alone or mixed with an inert gas; the said tube-length 17 is fitted with a valve 21 which can be provided with an automatic regulation system (as is well known in practice) by means of which the introduction of nitrogen or of the gaseous mixture can be regulated as a function of the pressure which prevails inside the enclosure, in such manner as to maintain this pressure at a constant and pre-determined value.

As has been stated above, the nitrogen pressure has not in itself any appreciable influence on the nitriding reaction. In actual practice, however, it is preferable to maintain a constant pressure in order not to modify the rate of action of the arc and thus to make it possible to perform the operation under substantially constant and reproducible conditions. Also with a view to facilitating the action of the arc, there will preferably be maintained a total pressure which is either lower than or equal to 760 mm. of mercury.

Inasmuch as the lateral movement of the piston is effected under atmospheric pressure, provision can be made, if the operation is carried out at low pressure, for means such as a spring 22 (or any other like means) for the purpose of automatically balancing the pressure.

The first pellets 14 being caused to melt at 23 by the action of the arc, the nitriding reaction takes place rapidly and there is thus obtained a liquid phase containing a eutectic of metallic oxide and metallic nitride; this eutectic solidifies at 24 above the cooled piston 11. If the speed of downward travel of the piston 11 is co-ordinated with the speed of introduction of the pellets 14 in such manner that the surface of the molten bath remains at a substantially stationary level, the result thereby achieved is to maintain the flashover voltage between the electrode and the bath at a constant value, there being thus obtained at the same time an ingot which can be withdrawn from the furnace in a continuous manner.

Means can be provided for producing the automatic interruption of the arc, the stoppage of the charging operation and the downward movement of the piston when the desired length of ingot has been reached in the cylinder 10.

It is thus possible to produce at will and in a single operation an ingot which has the desired diameter and length; moreover, if the ingot has to be finished to within a very fine tolerance on the diameter, it is possible to effect the machining of the ingot according to the methods normally employed for ceramic materials.

There will now be described below various examples of practical application of the method for the manufacture of new refractory products which forms the subject of the invention, the same examples being given without implied limitation. The practical arrangements which will be described in connection with these examples must be considered as forming part of the invention, it being understood that any equivalent arrangements can equally well be employed without thereby departing from the scope of the said invention.

*Example 1*

This example relates to the manufacture of a refractory fuel constituted by a eutectic $UO_2/UN$. This manufacturing process is carried out in an apparatus similar to that which is illustrated in the figure. The raw materials are introduced in the form of pellets containing an equimolecular mixture of uranium dioxide and carbon.

The arc furnace is filled with nitrogen at a pressure of 200 mm. of mercury which is maintained during the entire operation and a current of 800 amps. at 15 volts is supplied. There is thus obtained the eutectic $UO_2/UN$ in the form of ingots 30 mm. in diameter and 200 mm. in length.

*Example 2*

This example relates to the manufacture of a refractory fuel which is made up of a eutectic $ThO_2/UN$; the composition of this eutectic corresponds to 0.25 molecule of $ThO_2$ for 0.75 molecule of UN. There is fed into the arc furnace employed in the case of Example 1 a mixture having a composition which corresponds to 0.25 molecule of $ThO_2$ for 0.75 molecule of uranium. A mixture of nitrogen and argon is employed and a total pressure of 600 mm. of mercury is maintained within the enclosure during the entire operation, the partial pressure of nitrogen being equal to 200 mm. of mercury. A current of 1,000 amps. at 15 volts is used. There is thus obtained the eutectic $ThO_2/UN$ in the form of ingots 40 mm. in diameter and 300 mm. in length.

*Example 3*

This example relates to the manufacture of a refractory fuel which is made up of a eutectic $ThO_2/ThN$, the composition of which corresponds to 0.15 molecule of $ThO_2$ for 0.85 molecule of ThN. There are fed into the arc furnace employed in the previous examples pellets containing a mixture of thorium dioxide and carbon; the composition of this mixture corresponds to 0.15 molecule of $ThO_2$ for 1.7 molecules of C. The arc furnace is filled with nitrogen at a pressure of 500 mm. of mercury which is maintained during the entire operation. A current of 800 amps. is supplied at a voltage of 15 volts. The eutectic $ThO_2/ThN$ is obtained in the form of ingots 15 mm. in diameter and 150 mm. in length.

As will be readily understood, and as has already been brought out by the foregoing, other modes of application and practical arrangement could be contemplated without thereby departing from the scope of the present invention. It accordingly follows in particular that the invention can be employed for the preparation of eutectics $XO_2/XN$ or $XO_2/YN$, in which X and/or Y can designate no longer one metal alone chosen in the actinide series or lanthanide series, but two or more metals of the said series having oxides or nitrides which are isomorphous and capable of forming solid solutions.

What we claim is:

1. The method of preparing a refractory product comprising the steps of preparing a mixture of an actinide metal oxide and a member selected from the group consisting of an actinide metal and carbon, continuously charging said mixture into an electric arc furnace supplying a regulated flow of nitrogen to said mixture in said furnace, heating said mixture to a liquid, eutectic state by means of an electric arc, forming a cylindrical ingot of said liquid mixture and solidifying said cylindrical ingot by indirect contact with a cooling liquid.

2. A method according to claim 1 in which the pressure of nitrogen is between 50 and 760 mm. of mercury.

3. A method in accordance with claim 2, in which the nitrogen is diluted with an inert gas, the total pressure of the gases remaining lower than 760 mm. of mercury.

4. The method according to claim 1 wherein the total pressure of the gases is maintained at about 760 mm. of mercury.

5. A method in accordance with claim 1, in which the heating is produced by induction.

6. The method according to claim 1 wherein the heating is produced by means of an electric arc furnace.

7. A method of preparing a refractory product comprising a eutectic of an actinide metal oxide and an actinide metal nitride such that the oxide and nitride combination possesses the greatest heat of formation and is isomorphous and capable of forming solid solutions comprising the steps of mixing said metal oxide and free actinide metal as a source of nitride in molecular proportion corresponding to the oxide/nitride ratio in said final eutectic, heating said mixture to its melting temperature in a nitrogen atmosphere and simultaneously nitriding said free metal to form an actinide oxide/nitride eutectic and cooling the eutectic to solidification.

8. A method according to claim 7 wherein said metals are at least one member selected from the group consisting of thorium, uranium and plutonium.

9. A method of preparing a refractory product comprising a eutectic of an oxide and a nitride of the same actinide metal, such that the oxide and nitride combination possesses the greatest heat of formation and is isomorphous and capable of forming solid solutions comprising the steps of mixing an oxide of said metal and carbon, the molecular percentage of carbon in the mixture being substantially double the molecular percentage of nitride in the final eutectic, heating said mixture to its melting temperature in a nitrogen atmosphere and thereby reducing a portion of the oxide to the corresponding metal by oxidation and evolution of said carbon as its oxide and nitriding said metal to form an oxide-nitride eutectic and cooling said eutectic to solidification.

10. A method according to claim 9 in which said metal is selected from the group consisting of thorium, uranium and plutonium.

11. A refractory product comprising a eutectic of an actinide metal oxide and an actinide metal nitride such that the oxide and nitride combination possesses the greatest heat of formation and is isomorphous and capable of forming solid solutions.

12. A product according to claim 11 in which said metals are at least one member selected from the group consisting of thorium, uranium and plutonium.

References Cited by the Examiner

UNITED STATES PATENTS

| | | | |
|---|---|---|---|
| 2,883,721 | 4/1959 | Gorga et al. | 22—57.2 |
| 2,955,333 | 10/1960 | Berry et al. | 22—57.2 |
| 3,035,895 | 5/1962 | McCorkle et al. | 23—14.5 |
| 3,044,946 | 7/1962 | Litton | 252—301.1 |
| 3,055,816 | 9/1962 | Paine et al. | 75—122.5 |

OTHER REFERENCES

AEC Report BMI-926, Sept. 4, 1957, pp. 8–10.

Chemical and Process Engineering, July 1960, vol. 41, No. 7, pp. 291.

Journal of the Less Common Metals, June 1959, vol. 1, pp. 217–226 or Abstract in Nuclear Science Abstracts, vol. 13, Abstract No. 20232.

CARL D. QUARFORTH, *Primary Examiner.*

REUBEN EPSTEIN, *Examiner.*